Feb. 4, 1936.   W. L. CHEWNING   2,029,611

DISK FILTER

Filed May 10, 1934

WITNESS:

INVENTOR
Walter L. Chewning
BY
Augustus B. Stoughton.
ATTORNEY.

Patented Feb. 4, 1936

2,029,611

UNITED STATES PATENT OFFICE 2,029,611

DISK FILTER

Walter L. Chewning, Cynwyd, Pa., assignor to United Engineers & Constructors Inc., Philadelphia, Pa., a corporation of Delaware Application May 10, 1934, Serial No. 724,839

2 Claims. (Cl. 210—167)

The present invention relates to filters for filtering lubricating oil, fuel oil and other liquids. More particularly it relates to self cleaning filters of the disk type, in which the liquid is filtered by passage between spaced thin disks arranged in a stack, which is revolved so that the spaces between the disks are swept by cleaning blades.

The principal object of the present invention is to provide improvements in such filtering apparatus by means of which the filtering operation is benefited.

The invention can be most readily described and understood in connection with the accompanying drawing which forms a part of this specification and which shows a form of the invention chosen for illustration and in which—

Figure 2:
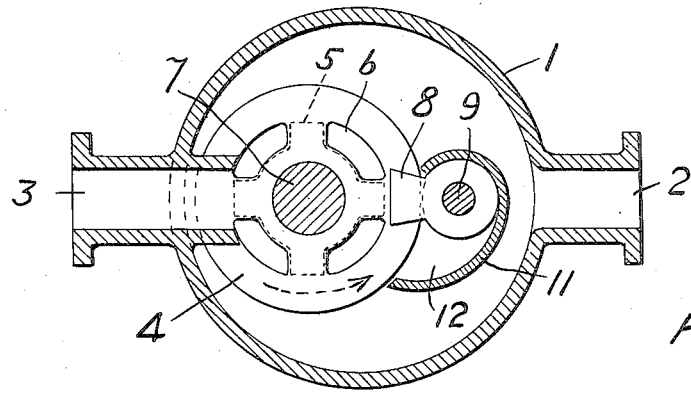
Figure 1:
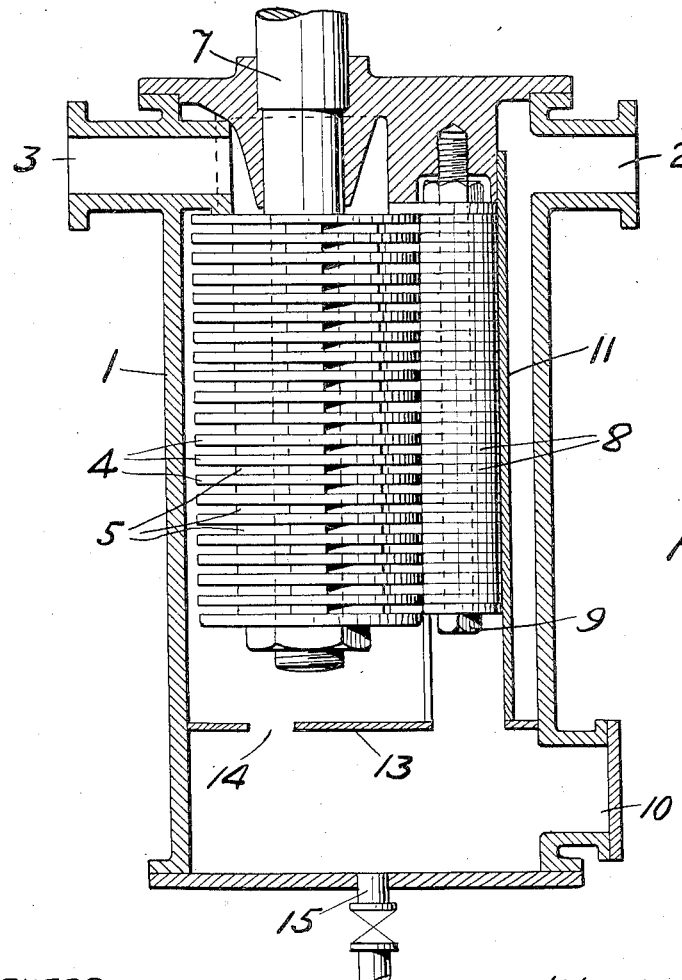

Figure 1 shows a view chiefly in vertical cross section illustrating a form of the invention, and Figure 2 shows a horizontal section along the line AA in Figure 1.

Referring to the drawing:

1 generally indicates the casing of the apparatus which is provided with a liquid inlet 2 and a liquid outlet 3.

Arranged within the casing is a revolvable stack of disks made up of alternate filter disks 4 and spacers 5 (the latter shown in full lines in Figure 1 and dotted lines in Figure 2). The filter disks are provided with perforations such as are indicated at 6 in Figure 2. The disks and spacers are also provided with a central hole for assembly on the shaft 7 which passes through the top of the casing and is arranged to be revolved by means (not shown) such for instance as an electric motor through reduction gearing.

The stationary cleaning blades 8 are assembled on the bolt 9 and extend between the filtering disks 4, being arranged to sweep the surfaces of the disks as the disk stack is revolved.

The above generally describes filters of the prior art upon which the present invention is intended to improve.

In the operation of the above apparatus, the liquid, for instance lubricating oil, enters the casing through the inlet 2, and flows through the slots formed by the spaced filtering disks, which slots may be very thin depending on the thickness of the spacers. In Figure 1, the thickness of the slots is exaggerated to show them more clearly. Any solids larger than the thickness of the slots are held on the outside of the disk stack, the filtered oil passing in to the interior of the stack and upward through channels formed by the perforations 6 to the outlet 3.

As the stack slowly revolves the cleaning blades sweep the spaces beeween the filter disks and keep the slots open.

The solids removed by the cleaning blades settle to the bottom of the casing, from which they may be periodically removed, for instance through the clean-out opening 16.

In apparatus previously provided, the solid material removed from the filter stack by the cleaning blades is removed into the general body of unfiltered oil surrounding and about to enter the filter stack. The flow of the oil through the apparatus hinders the settling of the removed solids of which a portion is carried back to the stack increasing the duty on the filter and reducing its capacity tending to make the apparatus inoperative.

According to the present invention I provide a shield or partition means such as for illustration the partition 11 arranged to provide what may be termed a well of relatively quiescent liquid adjacent the point of removal of the solids from the stack by the cleaner blades, permitting the settlement of the solids toward the base of the filter chamber undisturbed by the flow of oil into the chamber and into the stack. In Figure 2 the dotted arrow on the disk 4 shows, for instance, the direction of rotation of the stack. With the rotation of the stack the blades such as 8 push the solids accumulated in and against the slots into the space or well 12 enclosed by the stack and the partition 11. The liquid entering the chamber from the inlet 2 flows around the partition to the stack, without hindering the settlement of the solids in the well 12.

If desired the base of the chamber may be provided with a horizontal partition 13 vented at 14, forming an enclosed sump with which the well 12 communicates. 15 indicates a drainage connection.

It will be obvious to those skilled in the art that modifications may be made in the illustrated apparatus as to details in the arrangement of the means to provide a quiescent space adjacent the cleaning blades for the settlement of the solids without departing from the spirit of the invention which is not limited to such matters or otherwise than the prior art and the appended claims may require.

I claim:—

1. In a filter of the type described having a casing having an inlet and an outlet therein, the combination of a rotary stack of disks and spacers between which fluid passes from the outer surface to the interior of the stack, a stack of cleaning blades arranged in said inlet and on the exterior of the stack to sweep the surfaces of the disks, and a shield structure arranged in the casing in said inlet and surrounding said stock of cleaning blades and defining a well of relatively quiescent liquid at the region of the cleaning blades and having an open bottom.

2. In a filter of the type described having a casing having an inlet and an outlet therein, the combination of a rotary stack of disks and spacers between which fluid passes from the outer surface to the interior of the stack, a stack of cleaning blades arranged in said inlet and on the exterior of the stack to sweep the surfaces of the disks, a shield structure arranged in the casing in said inlet and surrounding said stack of cleaning blades and defining a well of relatively quiescent liquid at the region of the cleaning blades and having an open bottom, and a generally horizontal partition extending from the shield structure across the interior of the casing to provide a sump at the bottom of the casing.

WALTER L. CHEWNING.